United States Patent [19]

Iida et al.

[11] Patent Number: 4,961,979
[45] Date of Patent: Oct. 9, 1990

[54] OPTICAL RECORDING MEDIUM

[75] Inventors: Atsuko Iida, Yokohama; Hirosi Ohdaira, Chigasaki; Masaki Katsura, Yokosuka; Reiji Nishikawa, Yokohama; Norio Ozawa, Kawasaki, all of Japan

[73] Assignee: Kabushiki Kaisha Toshiba, Kawasaki, Japan

[21] Appl. No.: 333,268

[22] Filed: Apr. 5, 1989

[30] Foreign Application Priority Data

Apr. 5, 1988 [JP] Japan .................................. 63-83808
Aug. 23, 1988 [JP] Japan ................................ 63-208603

[51] Int. Cl.⁵ .............................................. B32B 3/00
[52] U.S. Cl. ........................................ 428/64; 428/65;
428/209; 428/457; 428/913; 346/76 L;
346/135.1; 430/945; 369/288
[58] Field of Search ................... 428/64, 65, 209, 457,
428/913; 346/76 L, 135.1; 430/945; 369/288

[56] References Cited

U.S. PATENT DOCUMENTS 4,357,616 11/1982 Terao et al. ...................... 346/135.1
4,500,889 2/1985 Wada et al. ......................... 346/1.1

FOREIGN PATENT DOCUMENTS 54-3725 8/1973 Japan .
62-141658 12/1985 Japan .

*Primary Examiner*—Patrick Ryan
*Attorney, Agent, or Firm*—Oblon, Spivak, McClelland, Maier & Neustadt

[57] ABSTRACT

Disclosed is an optical recording medium comprising a transparent substrate having a tracking line formed therein, and a recording layer formed on that surface of the substrate in which is formed the tracking line. The recording layer consists of a low oxide of nickel. Also disclosed is an optical recording medium comprising a transparent substrate consisting of a thermoplastic resin, a thermosetting resin layer formed on each surface of the substrate, a patterned photoresist layer, said patterned photoresist layer being formed on one of the thermosetting resin layer, and a recording layer formed to cover the exposed portion of the thermosetting resin layer and the patterned photoresist layer.

13 Claims, 2 Drawing Sheets

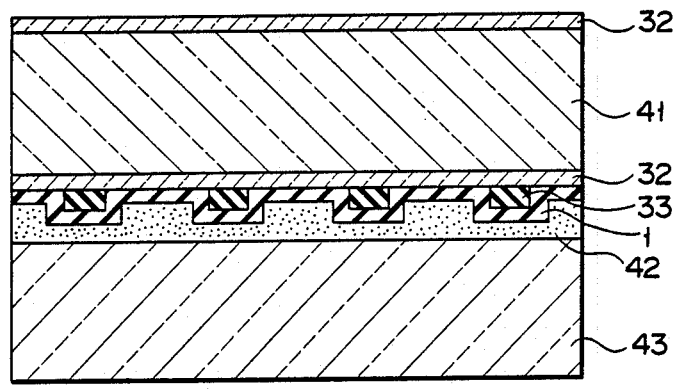
F I G. 4
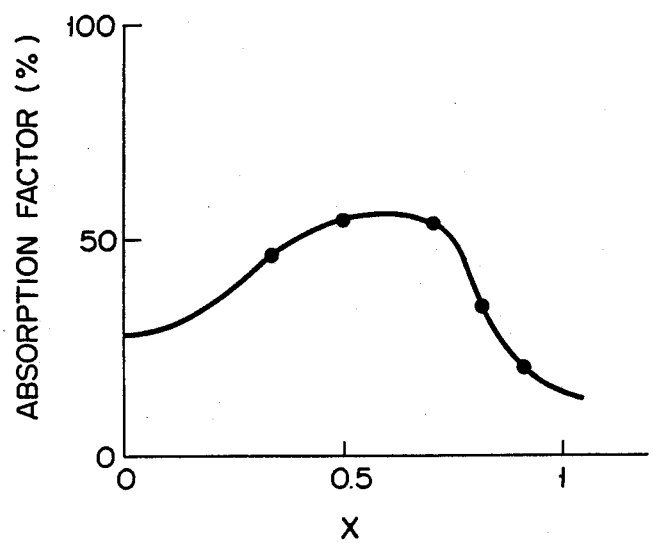
F I G. 5

OPTICAL RECORDING MEDIUM

BACKGROUND OF THE INVENTION

1. Field of the Invention

The present invention relates to an optical recording medium capable of rapidly recording/reproducing optical information of high density by utilizing a laser beam.

2. Description of the Related Art

An optical recording medium for recording/ reproducing information of high density by utilizing a laser beam comprises a transparent substrate and a recording layer formed on the substrate. In the conventional optical recording medium, the recording layer is selectively irradiated with a laser beam, with the result that, for example, a pit is formed in the irradiated portion by the heat energy of the laser beam so as to perform the information recording. The mechanism of the pit formation in the recording layer has not yet been clarified in detail. However, two phenomena are considered to accompany the pit-forming mechanism, i.e., (1) evaporation of a material forming the recording layer, and (2) melting of the material forming the recording layer, leading to aggregation of the molten material around the laser beam-irradiated region by the surface tension of the melt. These phenomena cause a geometrical change of the atoms forming the recording layer. In this recording system, the recording layer is formed of a material having a relatively low evaporation temperature and a relatively low melting point. In addition, the material should be low in its heat conductivity in order to improve the resolution. A material consisting of oxides of Bi, Te and In, metal Te and an organic compound is used in general for forming the recording layer included in the optical recording medium of the ablation type described above.

In order to miniaturize and simplify the recording and reproducing apparatuses of the optical recording medium, the recording layer should desirably be capable of information writing by a low power laser such as a GaAlAs semiconductor laser. In particular, a recording layer capable of information writing by a low power laser is of high importance when it comes to an optical recording medium such as an optical card. It should be noted in this connection that the ablation type optical recording medium, which certainly permits information writing in the case of using a high power laser such as an argon gas laser, carbon dioxide gas laser or a YAG laser, is incapable of exhibiting a sufficiently high recording sensitivity in the case of using a low power semiconductor laser. This made it difficult to miniaturize and simplify the conventional recording and reproducing apparatuses.

An optical recording medium such as an optical card may be handled easily, if it is possible to paste a protective substrate with an adhesive directly to the recording layer formed on the transparent substrate. In the ablation type optical recording medium, however, the material forming the recording layer is evaporated, making it unavoidable to employ the so-called "air sandwich structure". It follows that the ablation type optical recording medium leaves room for further improvement in its handling.

Recently, a new type of optical recording medium has been announced. The medium comprises a recording layer formed of a material which brings about phase transition upon laser beam irradiation. However, the recording layer of the phase transition type medium is formed of a complex compound, leading to a low productivity and a high manufacturing cost.

What should also be noted is that, in the optical recording medium, it is necessary to use a pregrooved substrate formed of, for example, a polycarbonate resin because the tracking is performed by detecting the difference in the intensity of the reflected light derived from the difference in the optical paths of the incident light beams. The pregroove providing the tracking line must be precisely formed in a depth of 100 nm or less. In general, the substrate having such a pregroove is formed by injection molding of resin using a mold having a fine pattern of projection corresponding to the tracking line. However, it is necessary to control very strictly the conditions such as the mold temperature in order to manufacture a substrate having a fine pregroove by injection molding.

SUMMARY OF THE INVENTION

A first object of the present invention is to provide an optical recording medium capable of performing its recording function at a sufficiently high sensitivity even with a low power laser beam and capable of manufacture with a high productivity and a low cost.

A second object is to provide an optical recording medium which permits readily forming a fine tracking pattern by means of photolithography.

The optical recording medium meeting the first object comprises a transparent substrate having a tracking line formed thereon, and a recording layer formed on the surface of the substrate on which the tracking line is formed, said recording layer being formed of a low oxide of nickel. The term "low oxide of nickel" represents $NiO_x$ where x is smaller than 1. The optical recording medium of this construction makes it possible to perform its recording function at a sufficiently high sensitivity even with a low power laser beam. In addition, the medium can be manufactured with a high productivity and at a low cost.

The optical recording medium meeting the second object comprises a transparent substrate formed of a thermoplastic resin, a thermosetting resin layer formed on each surface of the substrate, a patterned resin layer formed on one of the thermosetting resin layers, said patterned resin layer being capable of light absorption, and a recording layer formed to cover the exposed portion of the thermosetting resin layer and the patterned resin layer capable of light absorption. The optical recording layer of this construction permits readily forming a fine tracking line by means of photolithography, electron beam lithography and so on, leading to a low manufacturing cost.

BRIEF DESCRIPTION OF THE DRAWINGS

FIG. 4 is a cross sectional view showing the construction of the optical recording medium manufactured in Example 9 of the present invention; and FIG. 5 is a graph showing the absorption factor of light having a wavelength of 830 nm relative to the value of "x" for NiOx layers.

DETAILED DESCRIPTION OF THE PREFERRED EMBODIMENTS

The optical recording medium of the present invention comprises a recording layer formed of a low oxide of nickel represented by NiOx. The low oxide of nickel, which is dark brown before irradiation with a laser beam, is heated and oxidized upon irradiation with a laser beam. As a result, the composition of the nickel compound becomes close to NiO. What should be noted is that NiOx and NiO differ from each other in optical properties. For example, the recording layer under the state of NiO permits a high transmittance of visible light. However, the transmittance of visible light is low under the state of NiOx. By the contrary, the recording layer under the state of NiO is low in reflectance of visible light; whereas, the reflectance of visible light is high under the state of NiOx. In the optical recording medium of the present invention, these changes in optical properties are utilized for achieving the information writing, i.e., the recording function.

The value of "x" for NiOx forming the recording layer included in the optical recording medium of the present invention should be 0.5 to 0.8, preferably 0.5 to 0.7. It is impossible to obtain a sufficiently high recording sensitivity, if the value of "x" does not fall within the range of between 0.5 and 0.8.

In the present invention, the chemical reaction of low oxides of nickel is utilized for the information recording, making it possible to use a semiconductor laser having a low output power. The use of a semiconductor laser permits miniaturizing the recording/ reproducing apparatuses. In addition, the manufacturing cost of the apparatus can be lowered. Further, evaporation of the material of the recording layer, which takes place in the ablation type optical recording medium, does not take place in the optical recording medium of the present invention. Thus, no inconvenience is brought about even if another substrate is pasted with an adhesive directly to the recording layer formed of a low oxide of nickel, making it possible to provide an optical card which can be handled easily. What should also be noted is that the low oxide of nickel is low in its heat conductivity, with the result that the energy loss is small in the recording step and a high resolution can be obtained.

Figure 1:
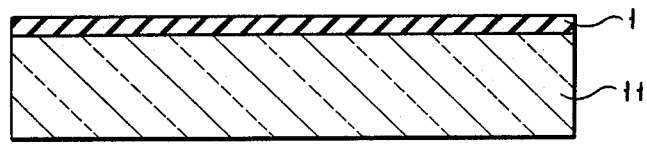
FIG. 1 is a cross sectional view showing the construction of the optical recording medium manufactured in each of Examples 2 to 4 of the present invention.
Figure 2:
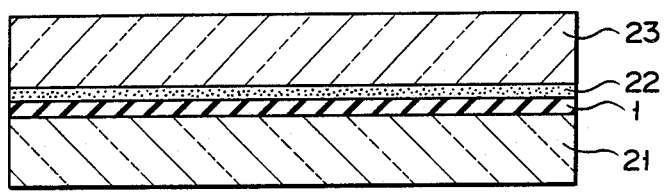
FIG. 2 is a cross sectional view showing the construction of the optical recording medium manufactured in each of Examples 5 to 7 of the present invention.

FIGS. 1 and 2 show the constructions of the optical recording media described above. FIG. 1 shows that a NiOx recording layer 1 is formed on a pregrooved transparent disk 11 to form an optical recording medium. On the other hand, FIG. 2 shows that a NiOx recording layer 1 is formed on a transparent film 21. Also, a protective film 23 is pasted to the recording layer 1, with an adhesive 22 disposed directly between the recording layer and the protective film. Further, the resultant laminate structure is punched in a standard card size.

In the present invention, the recording layer consisting of a low oxide of nickel represented by NiOx is formed on a substrate by, for example, (1) a reactive sputtering method using a mixed gas containing at least an argon gas and an oxygen gas, and nickel as a target, (2) a vacuum evaporation of nickel oxide, or (3) a sputtering method using an argon gas and nickel oxide as a target. These methods make it possible to form a NiOx recording layer of a wide composition range. Thus, a large allowance can be provided in respect of the manufacturing conditions, leading to an improved productivity of the optical recording medium.

The optical recording medium according to the second embodiment of the present invention comprises a transparent substrate formed of a thermoplastic resin, a thermosetting resin layer formed on each surface of the substrate, a patterned resin layer formed on one of the thermosetting resin layers, said patterned resin layer being capable of light absorption, and a recording layer formed to cover the exposed portion of the thermosetting resin layer and the patterned resin layer capable of light absorption.

The thermoplastic resin used in the present invention for forming the transparent substrate includes, for example, polycarbonate, polyethylene terephthalate, and polyester. The thermosetting resin layer formed on each surface of the substrate consists of, for example, melamine resin. The patterned resin layer capable of light absorption can be formed by applying, for example, a photolithography using a photoresist so as to achieve patterning which corresponds to a tracking line.

In the case of forming a tracking line on a transparent substrate consisting of a thermoplastic resin, the tracking line can be formed with a high accuracy, if it is possible to use a photoresist for forming the tracking line. The process by means of photolithography involving the use of a photoresist may include the steps of coating the surface of a substrate with a photoresist solution; irradiating the resultant photoresist layer with an ultraviolet light through a glass mask, followed by development to form a photoresist pattern corresponding to the tracking line. However, the substrate consisting of a thermoplastic resin tends to be corroded by the photoresist solution. Furthermore, the photoresist readily reacts with the resin forming the substrate when the substrate is coated with the photoresist solution. It follows that the photoresist is not completely dissolved in the step of development, making it impossible to apply photolithography.

In the present invention, however, a thermosetting resin layer is formed on the transparent substrate, as described above. Thus, in the step of coating the thermosetting resin layer with a photoresist solution in the manufacture of the optical recording medium, the thermosetting resin layer prevents the solution from reaching the substrate. Naturally, the substrate is not corroded so as to ensure application of the photolithography. It follows that the photoresist pattern corresponding to the tracking line can be formed without difficulty and at a low cost. It should also be noted that the detecting apparatus can be simplified because the tracking line is formed accurately in the optical recording medium of the present invention.

Figure 3:
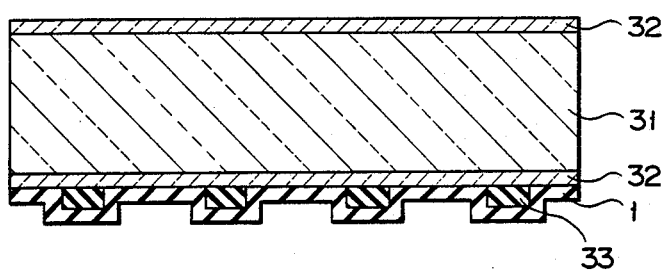
FIG. 3 is a cross sectional view showing the construction of the optical recording medium manufactured in Example 8 of the present invention.

FIGS. 3 and 4 show optical recording media according to the second embodiment of the present invention. In the optical recording medium shown in FIG. 3, a thermosetting resin layer 32 is formed on each surface of a transparent disk 31 consisting of a thermoplastic resin. A photoresist pattern 33 is formed on one of the thermosetting resin layers 32. Further, a recording layer 1 consisting of NiOx is formed to cover the photoresist pattern 33 and the exposed portion of the thermosetting resin layer 32.

The optical recording medium shown in FIG. 4 comprises a transparent film 41 consisting of a thermoplastic resin, a thermosetting resin layer 32 formed on each surface of the transparent film 41, a photoresist pattern 33 formed on one of the thermosetting resin layers 32, and a recording layer 1 consisting of NiOx. As in the medium shown in FIG. 4, the recording layer 1 is formed to cover the photoresist pattern 33 and the exposed portion of the thermosetting resin layer 32. Further, the NiOx recording layer 1 is coated directly with an adhesive 42 and a primary substrate 43 is pasted to the recording layer with the adhesive 42 interposed therebetween.

In the optical recording medium of the present invention, it is possible to use, for example, a GaAlAs semiconductor laser having a wavelength of 830 nm for the writing and reading of information.

EXAMPLE 1

The optical properties of a low oxide of nickel represented by NiOx were examined by the experiment described below. Specifically, a glass substrate and a target of nickel were set in a RF sputtering apparatus. A mixed gas consisting of an argon gas and an oxygen gas was introduced into the sputtering apparatus so as to form a NiOx layer on the glass substrate by the reactive sputtering under the gas pressure of 5 mTorr and a power of 500 W. A plurality of samples were prepared, in which "x" for NiOx differs within the range of between 0 and 1.0, by changing the flow ratio of the argon gas to the oxygen gas. The composition of NiOx was examined by an element analysis. The rate of deposition of the NiOx layer under the conditions employed in this experiment was 5 to 25 nm/min. The deposition rate was calculated from the thickness of the NiOx layer measured by a differential meter and the deposition time.

Each of the samples having the NiOx layers of different compositions was irradiated with a laser beam having a wavelength of 830 nm, which was emitted from a GaAlAs laser, so as to measure the absorption factor of the sample. FIG. 5 shows the relationship between the value of "x" and the absorption factor in this experiment.

Then, a laser beam having a wavelength of 830 nm, which was emitted from a GaAlAs laser, was converged in a diameter of 5 microns on each of the NiOx layers differing from each other in the value of "x" within the range of between 0.25 and 1.0 so as to perform information writing. The output power of the laser beam used was 7 mW. After the information writing, each of the NiOx layers was irradiated with a laser beam having a wavelength of 830 nm so as to measure the reflectance. The recording characteristics of the optical recording medium were evaluated on the basis of the recording sensitivity. The recording sensitivity ($S_R$) is calculated as follows:

$$S_R = \frac{R_1 - R_2}{R_1 + R_2} \times 100$$

wherein $R_1$ is reflectance before recording, $R_2$ is reflectance after recording. Table 1 shows the results.

TABLE 1

| X | 0.25 | 0.3 | 0.5 | 0.6 | 0.7 | 0.75 | 0.8 | 0.9 | 1.0 |
|---|---|---|---|---|---|---|---|---|---|
| $S_R$ | x | x | | | | | Δ | x | x |

Note: 50% or more;  50 to 30%;  Δ 30 to 10%;  x 10% or less

It has also been found that an optical change is brought about in the information-written region in the case of using a beam having a wavelength of 700 to 900 nm, making it possible to use a beam having a wavelength of this range for the information writing.

Further, it has been found by an X-ray diffractometry that the NiOx layer is of an amorphous structure or crystalline structure containing both Ni and NiO. The information writing was found possible in the NiOx layer of either amorphous structure or crystalline structure.

EXAMPLE 2

A NiOx recording layer was formed on a pregrooved polycarbonate disk having a thickness of 1.2 mm by the reactive sputtering method using a nickel target and a mixed gas consisting of an argon gas and an oxygen gas so as to prepare an optical recording medium constructed as shown in FIG. 1. The reactive sputtering was performed under a power of 500 W, a gas pressure of 5 mTorr, an argon gas flow rate of 18.2 sccm and an oxygen gas flow rate of 1.8 sccm (the flow ratio of the argon gas to the oxygen gas being 10:1). The NiOx layer thus formed was 80 nm in thickness, the rate of deposition of the NiOx layer was 18 nm/min, and the "x" for NiOx was 0.7.

In the optical recording medium thus prepared, the reflectance of the laser beam having a wavelength of 830 nm, which passes through the disk and is reflected by the NiOx recording layer, was 43%. The medium was irradiated with the laser beam having a wavelength of 830 nm, which was incident on the polycarbonate disk, at an output power of 7 mW such that the laser beam was converged in a diameter of 5 microns on the surface of the NiOx recording layer. It has been found that the reflectance of the laser beam having a wavelength of 830 nm in the written region of the NiOx recording layer was decreased to 10%. Thus, the recording sensitivity was 62%.

The reflectance, both before and after recording, which is referred to in Examples 3 to 9, was measured in this fashion.

EXAMPLE 3

A NiOx recording layer was formed on a pregrooved polycarbonate disk having a thickness of 1.2 mm by the sputtering method using a nickel oxide target and an argon gas so as to prepare an optical recording medium constructed as shown in FIG. 1. The sputtering was performed under a power of 500 W, and a gas pressure of 5 mTorr. The NiOx layer thus formed was 80 nm is thickness, the rate of deposition of the NiOx layer was 10 nm/min, and the value of "x" for NiOx was 0.6.

In the optical recording medium thus prepared, the reflectance of a laser beam having a wavelength of 830 nm from the NiOx recording layer was 45%. The recording medium was irradiated with a laser beam having a wavelength of 830 nm at an output power of 7 mW such that the beam was converged in a diameter of 5 microns on the surface of the NiOx recording layer. It has been found that the reflectance of the laser beam having a wavelength of 830 nm in the written region of the NiOx recording layer was decreased to 15%. Thus, the recording sensitivity was 50%.

EXAMPLE 4

A NiOx recording layer was formed on a pregrooved polycarbonate disk having a thickness of 1.2 mm by a vacuum vapor deposition method so as to prepare an optical recording medium constructed as shown in FIG. 1. The vacuum vapor deposition was performed under a vacuum of $5 \times 10^{-6}$ Torr. The NiOx layer thus formed was 80 nm in thickness, the rate of deposition of the NiOx layer was 30 nm/min, and the value of "x" for NiOx was 0.75.

In the optical recording medium thus prepared, reflectance of a laser beam having a wavelength of 830 nm from the NiOx recording layer was 40%. The recording medium was irradiated with a laser beam having a wavelength of 830 nm at an output power of 7 mW such that the beam was converged in a diameter of 5 microns on the surface of the NiOx recording layer. It has been found that the reflectance of the laser beam having a wavelength of 830 nm in the written region of the NiOx recording layer was decreased to 18%. Thus, the recording sensitivity was 38%.

EXAMPLE 5

A NiOx recording layer was formed on a pregrooved polycarbonate film, which had been pretreated, having a thickness of 400 microns by the sputtering method using a nickel target and a mixed gas consisting of an argon gas and an oxygen gas. The sputtering was performed under a power of 500 W, a gas pressure of 5 mTorr, an argon gas flow rate of 18.2 sccm and an oxygen gas flow rate of 1.8 sccm (the flow ratio of the argon gas to the oxygen gas being 10:1). The NiOx layer thus formed was 80 nm in thickness, the rate of deposition of the NiOx layer was 18 nm/min, and the value of "x" for NiOx was 0.7. At this stage, the reflectance of a laser beam having a wavelength of 830 nm from the NiOx recording layer was 43%. After formation of the NiOx recording layer, the surface of the NiOx recording layer was directly coated with an urethane type adhesive, followed by pasting a polycarbonate protective film having a thickness of 400 microns to the NiOx recording layer, with the adhesive interposed therebetween. Finally, the resultant structure was punched in a standard card size so as to prepare an optical recording medium constructed as shown in FIG. 2.

In the optical recording medium thus prepared, the reflectance of a laser beam having a wavelength of 830 nm from the NiOx recording layer was 40%. Further, the optical recording medium was irradiated with a laser beam having a wavelength of 830 nm at a power output of 10 mW such that the laser beam was converged to a diameter of 5 microns on the surface of the NiOx recording layer. It has been found that the reflectance of the laser beam was decreased to 13% in the information-written region. Thus, the recording sensitivity was 51%.

EXAMPLE 6

An optical recording medium was prepared as in Example 5, except that the recording layer was formed by the RF sputtering method using a nickel oxide target and an argon gas. The RF sputtering was performed under a power of 500 W and a gas pressure of 5 mTorr. The NiOx recording layer formed under this condition was 80 nm in thickness, the deposition rate of the recording layer was 10 nm/min, and the value of "x" for NiOx was 0.6. After formation of the NiOx recording layer, the surface of the NiOx recording layer was directly coated with an urethane type adhesive, followed by pasting a polycarbonate protective film having a thickness of 400 microns to the NiOx recording layer, with the adhesive interposed therebetween. Finally, the resultant structure was punched in a standard card size so as to prepare an optical recording medium constructed as shown in FIG. 2.

In the optical recording medium thus prepared, the reflectance of a laser beam having a wavelength of 830 nm from the NiOx recording layer was 42%. Then, the NiOx recording layer was irradiated with a laser beam having a wavelength of 830 nm at a power output of 10 mW such that the laser beam was converged to a diameter of 5 microns on the surface of the NiOx recording layer. It has been found that the reflectance of the laser beam having a wavelength of 830 nm was decreased to 20% in the information-written region. Thus, the recording sensitivity was 35%.

EXAMPLE 7

An optical recording medium was prepared as in Example 5, except that the recording layer was formed by the vacuum vapor deposition of nickel oxide. The deposition was performed under a vacuum of $5 \times 10^{-6}$ Torr. The NiOx recording layer formed under this condition was 80 nm in thickness, the deposition rate of the recording layer was 30 nm/min, and the value of "x" for NiOx was 0.75. After formation of the NiOx recording layer, the surface of the NiOx recording layer was directly coated with an urethane type adhesive, followed by pasting a polycarbonate protective film having a thickness of 400 microns to the NiOx recording layer, with the adhesive interposed therebetween. Finally, the resultant structure was punched in a standard card size so as to prepare an optical recording medium constructed as shown in FIG. 2.

In the optical recording medium thus prepared, the reflectance of a laser beam having a wavelength of 830 nm from the NiOx recording layer was 37%. Then, the NiOx recording layer was irradiated with a laser beam having a wavelength of 830 nm, at a power output of 10 mW such that the laser beam was converged to a diameter of 5 microns on the surface of the NiOx recording layer. It has been found that the reflectance of the laser beam having a wavelength of 830 nm was decreased to 20% in the information-written region. Thus, the recording sensitivity was 30%.

It has been found with respect to the optical recording media prepared in Examples 2 to 7 that the similar results are obtained in the case of using a semiconductor laser emitting a laser beam having a wave-length of 780 nm for the information writing.

EXAMPLE 8

In the first step, both surfaces of a pretreated polycarbonate resin disk having a thickness of 1.2 mm were coated with a melamine type thermosetting resin, followed by curing the coating at 80° C. so as to form thermosetting resin layers. The surface of one of these thermosetting resin layers was coated in a thickness of 2 microns with a novolak phenol resin type positive photoresist by means of spray coating. Then, the positive photoresist was irradiated with an ultraviolet light through a glass mask having a fine tracking line and the address information patterned therein in advance, followed by development treatment so as to prepare a resist pattern representing the tracking line and the address information. After formation of the resist pattern, a NiOx recording layer was formed to cover the exposed portion of the thermosetting resin layer and the resist pattern by means of a reactive sputtering method using a nickel target and a mixed gas consisting of an argon gas and an oxygen gas so as to prepare an optical recording medium constructed as shown in FIG. 3. The reactive sputtering was performed under a power of 500 W, a gas pressure of 5 mTorr, an argon gas flow rate of 18.2 sccm and an oxygen gas flow rate of 1.8 sccm (the flow ratio of the argon gas to the oxygen gas being 10:1). The NiOx recording layer formed under this condition was 80 nm in thickness, the deposition rate of the NiOx layer was 18 nm/min, and the value of "x" for NiOx was 0.7.

The reflectance of a laser beam having a wavelength of 830 nm was 43% in the region other than the tracking line of the NiOx recording layer, and only 8% in the tracking line of the NiOx recording layer. Clearly, the optical recording medium thus prepared permits a good tracking function.

The optical recording medium thus prepared was irradiated with a laser beam having a wavelength of 830 nm so as to perform information writing. The information writing was performed by converging the laser beam emitted at a power output of 10 mW into a diameter of 1 micron on the region other than the tracking line of the NiOx recording layer while carrying out the tracking. It has been found that the reflectance of the laser beam having a wavelength of 830 nm was changed to 10% in the information-written region.

EXAMPLE 9

A melamine type thermosetting resin layer was formed on each surface of a pretreated polycarbonate resin film having a thickness of 400 microns, followed by forming a resist pattern and a recording layer consisting of a low oxide of nickel represented by NiOx (x=0.7), as in Example 8. The surface of the NiOx recording layer was coated with an urethane type adhesive, followed by pasting a primary polycarbonate resin substrate to the NiOx recording layer, with the adhesive interposed therebetween. Finally, the resultant structure was punched in a standard card size so as to obtain an optical recording medium constructed as shown in FIG. 4.

The information writing was performed by converging the laser beam having a wavelength of 830 nm, emitted at a power output of 10 mW into a diameter of 5 microns on the region other than the tracking line of the NiOx recording layer while carrying out the tracking. It has been found that the reflectance of the laser beam having a wavelength of 830 nm was changed to 13% in the information-written region.

What is claimed is:

1. An optical recording medium, comprising:
a transparent substrate having a tracking line formed therein; and
a recording layer consisting essentially of a low oxide of nickel represented by the general formula $NiO_x$ where x falls within the range of between 0.5 and 0.8; and
formed on that surface of the substrate in which is formed the tracking line.

2. The optical recording medium according to claim 1, wherein said x of the general formula falls within the range of between 0.5 and 0.7.

3. The optical recording medium according to claim 1, further comprising another substrate pasted directly to the recording layer consisting of said low oxide of nickel, with an adhesive interposed between said recording layer and said another substrate.

4. The optical recording medium according to claim 1, wherein said recording layer consisting of a low oxide of nickel is formed by a reactive sputtering method using a nickel target and a mixed gas containing at least an argon gas and an oxygen gas.

5. The optical recording medium according to claim 1, wherein said recording layer consisting of a low oxide of nickel is formed by a vacuum vapor deposition of nickel oxide.

6. The optical recording medium according to claim 1, wherein said recording layer consisting of a low oxide of nickel is formed by a sputtering method using a nickel oxide target and an argon gas.

7. An optical recording medium, comprising:
a transparent substrate consisting of a thermoplastic resin;
a thermosetting resin layer formed on each surface of the substrate;
a patterned resin layer capable of light absorption, said pattern resin layer being formed on one of the thermosetting resin layers; and
a recording layer consisting essentially of a low oxide of nickel represented by the general formula $NiO_x$, where x falls within the range of between 0.5 and 0.8 formed to cover the exposed portion of the thermosetting resin layer and the patterned resin layer capable of light absorption.

8. The optical recording medium according to claim 7, wherein the resin layer capable of light absorption is provided with a pattern acting as a tracking line.

9. The optical recording medium according to claim 8, wherein said x of the general formula falls within the range of between 0.5 and 0.7.

10. The optical recording medium according to claim 8, further comprising another substrate pasted directly to the recording layer consisting of said low oxide of nickel, with an adhesive interposed between said recording layer and said another substrate.

11. The optical recording medium according to claim 10, wherein said recording layer consisting of a low oxide of nickel is formed by a reactive sputtering method using a nickel target and a mixed gas containing at least an argon gas and an oxygen gas.

12. The optical recording medium according to claim 10, wherein said recording layer consisting of a low oxide of nickel is formed by a vacuum vapor deposition of nickel oxide.

13. The optical recording medium according to claim 10, wherein said recording layer consisting of a low oxide of nickel is formed by a sputtering method using a nickel oxide target and an argon gas.

* * * * *